No. 632,422. Patented Sept. 5, 1899.
M. P. McLAUGHLIN.
LOCK NUT.
(Application filed Feb. 11, 1899.)

(No Model.)

WITNESSES:

INVENTOR:

UNITED STATES PATENT OFFICE.

MILTON P. McLAUGHLIN, OF SOMERVILLE, MASSACHUSETTS, ASSIGNOR OF ONE-HALF TO JOHN HUNNEWELL, OF SAME PLACE.

LOCK-NUT.

SPECIFICATION forming part of Letters Patent No. 632,422, dated September 5, 1899.

Application filed February 11, 1899. Serial No. 705,276. (No model.)

*To all whom it may concern:*

Be it known that I, MILTON P. McLAUGHLIN, of Somerville, in the county of Middlesex and State of Massachusetts, have invented certain new and useful Improvements in Lock-Nuts, of which the following is a specification.

This invention relates to nuts which are used in pairs screwed side by side upon a single bolt, the one abutting against the other; and it has for its object to enable the pressure of the outer nut against the inner to cause a compression of a portion of the outer nut, and thus bind the outer nut firmly upon the bolt.

The invention consists in the improvements which I will now proceed to describe and claim.

Figure 1:
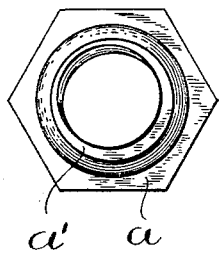
Figure 2:
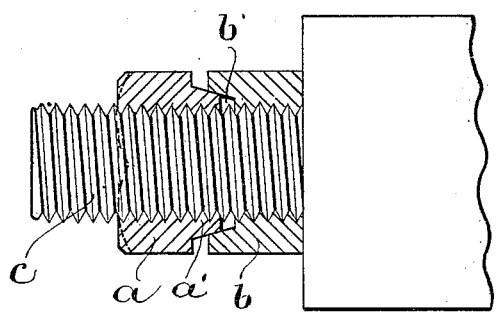

Of the accompanying drawings, forming a part of this specification, Figure 1 represents a side view of the outer nut. Fig. 2 represents a side view of a bolt, showing the two nuts in place thereon.

The same letters of reference indicate the same parts in both figures.

In the drawings, $a$ represents the outer nut, $b$ the inner nut, and $c$ the bolt upon which said nuts are screwed.

Upon the inner side of the nut $a$ is formed a continuous annular projection $a'$, which surrounds the bore of the nut and is concentric with the axial center of said bore, the thread of the nut extending through the projection. The external surface of the projection is tapered or frusto-conical.

The inner nut $b$ is provided with a tapering or frusto-conical socket $b'$, adapted to receive and fit the external surface of the projection $a'$, as shown in Fig. 2, the depth of the socket $b'$ being such that the projection $a'$ cannot reach the bottom of the socket. The wall or portion of the nut $b$ surrounding the socket $b'$ is so thick and rigid that the socket cannot be expanded by the pressure of the projection $a'$ against it. On the other hand, the projection $a'$ is so thin that it is adapted to be compressed by the operation of turning the nut $a$ inwardly until the projection $a'$ impinges upon and is compressed by the surrounding wall of the socket $b'$.

Owing to the fact that the projection $a'$ is concentric with the center or axis of the nut $a$, its compressibility is uniform all around the bore of the nut, its thickness being such that it can be readily compressed by the pressure caused by the muscular force of the operator in turning the nut $a$ to place against the nut $b$. The projection $a'$ is permanently contracted or set by this operation and caused to bind very firmly upon the bolt, so that its accidental loosening is practically impossible.

This improved nut is particularly useful for the bolts of fish-plates and for various other purposes.

Owing to the fact that the nuts $a$ and $b$ are both threaded to fit the bolt, they can be set and clamped at any point along the threads of said bolt. For many purposes this is an advantage, as it is not always desirable that the inner nut $b$ shall be set up against any immovable part. When the two nuts $a$ and $b$ are together, as above described, at any point lengthwise of the bolt and the projection $a'$ compressed upon the threads of the bolt the two bolts are locked at that point.

I claim—

A nut-locking device comprising two nuts adapted to be applied side by side to the same bolt, one having a continuous annular compressible projection which is concentric with the axis of the nut and has a tapered or frusto-conical external surface, while the other has a tapered recess adapted to receive and cause the compression of said projection.

In testimony whereof I have affixed my signature in presence of two witnesses.

MILTON P. McLAUGHLIN.

Witnesses:
A. D. HARRISON,
P. W. PEZZETTI.